United States Patent
Wu et al.

(10) Patent No.: US 10,056,851 B2
(45) Date of Patent: Aug. 21, 2018

(54) SYSTEM AND METHOD FOR INDUCTION MOTOR SPEED ESTIMATION USING A SOFT STARTER SYSTEM

(71) Applicant: Eaton Corporation, Cleveland, OH (US)

(72) Inventors: Dongxiao Wu, Shanghai (CN); Bruno Patrice-Bernard Lequesne, Menomonee Falls, WI (US); Yahan Hua, Shanghai (CN); Vijay Bhavaraju, Germantown, WI (US); Kaijam M. Woodley, Brown Deer, WI (US); Steven Andrew Dimino, Wauwatosa, WI (US)

(73) Assignee: Eaton Corporation, Cleveland, OH (US)

( * ) Notice: Subject to any disclaimer, the term of this patent is extended or adjusted under 35 U.S.C. 154(b) by 577 days.

(21) Appl. No.: 14/291,610

(22) Filed: May 30, 2014

(65) Prior Publication Data
US 2015/0349673 A1 Dec. 3, 2015

(51) Int. Cl.
H02P 6/182 (2016.01)
H02P 1/26 (2006.01)
H02P 29/02 (2016.01)

(52) U.S. Cl.
CPC ............ *H02P 1/26* (2013.01); *H02P 6/182* (2013.01); *H02P 2207/01* (2013.01)

(58) Field of Classification Search
USPC ........................................................ 318/806
See application file for complete search history.

(56) References Cited

U.S. PATENT DOCUMENTS 5,187,419 A * 2/1993 DeLange ................. H02P 3/18
  318/400.2
5,386,185 A * 1/1995 Beck ........................ H02P 3/24
  318/373
(Continued)

FOREIGN PATENT DOCUMENTS

DE 10213563 C1 9/2003
EP 1742347 A2 1/2007
(Continued)

OTHER PUBLICATIONS

Novotny et al., "Vector Control and Dynamics of AC Drives," Oxford Science Publications, Clarendon Press, Novotny and Lipo, 1996, p. 77.

(Continued)

*Primary Examiner* — Eduardo Colon Santana
*Assistant Examiner* — Said Bouziane
(74) *Attorney, Agent, or Firm* — Ziolkowski Patent Solutions Group, SC

(57) ABSTRACT

A system and method for estimating operating characteristics of an induction motor is disclosed. The system includes a motor control device that is electrically connectable between a motor and a power source. The motor control device includes a plurality of switching devices comprising at least one thyristor corresponding to a respective phase of the motor. The motor control device also includes a controller programmed to disconnect the power source from the motor for a predetermined time period following a first plurality of cycles of a mains phase voltage of the power source. The controller is further programmed to measure a back-emf voltage during the predetermined time period, estimate an operating characteristic of the motor from the measured back-emf voltage, and trigger the plurality of (Continued)

switching devices to reconnect the power source to the motor following estimation of the operating characteristic.

26 Claims, 6 Drawing Sheets

(56) References Cited

U.S. PATENT DOCUMENTS

| | | | |
|---|---|---|---|
| 5,548,197 A | 8/1996 | Unsworth et al. | |
| 6,414,463 B1 | 7/2002 | Griepentrog et al. | |
| 7,102,312 B2* | 9/2006 | Suzuki | H02P 6/12 |
| | | | 318/400.01 |
| 7,227,326 B1 | 6/2007 | Lu et al. | |
| 7,298,105 B1 | 11/2007 | Lu et al. | |
| 7,489,097 B2* | 2/2009 | Fu | B60K 6/26 |
| | | | 318/400.01 |
| 8,164,286 B2* | 4/2012 | Marioni | H02P 1/465 |
| | | | 318/400.11 |
| 8,203,298 B2 | 6/2012 | Lu et al. | |
| 8,242,719 B2 | 8/2012 | Kubal et al. | |
| 2005/0248308 A1* | 11/2005 | Reed | H02P 29/02 |
| | | | 318/806 |
| 2008/0100248 A1* | 5/2008 | Filippenko | H02J 9/061 |
| | | | 318/466 |
| 2008/0265828 A1 | 10/2008 | Ganev et al. | |
| 2009/0051311 A1* | 2/2009 | Lu | H02P 23/14 |
| | | | 318/806 |
| 2009/0218977 A1* | 9/2009 | Pan | H02M 7/493 |
| | | | 318/445 |
| 2010/0188037 A1* | 7/2010 | Acquaviva | H02P 1/465 |
| | | | 318/721 |
| 2010/0253257 A1* | 10/2010 | Clothier | H02P 23/0086 |
| | | | 318/400.12 |
| 2011/0011658 A1* | 1/2011 | Takizawa | B60L 3/0092 |
| | | | 180/65.31 |
| 2011/0313717 A1* | 12/2011 | Lu | G01P 3/48 |
| | | | 702/147 |
| 2014/0225554 A1* | 8/2014 | Penkov | H02P 1/028 |
| | | | 318/805 |
| 2015/0333685 A1* | 11/2015 | Wei | H02P 1/16 |
| | | | 318/430 |

FOREIGN PATENT DOCUMENTS

| | | |
|---|---|---|
| KR | 20110134513 A | 12/2011 |
| WO | 2009001291 A2 | 12/2008 |

OTHER PUBLICATIONS

Reynaud et al., "Reclosing Transients in Induction Machines Including the Effects of Saturation of the Magnetizing Branch and a Practical Case Study," IEEE Transactions on Energy Conversion, vol. 9, No. 2, Jun. 1994, pp. 383-389.

Faiz, et al., "Performance Analysis of Fast Reclosing Transients in Induction Motors," IEEE Transactions on Energy Conversion, vol. 14, No. 1, Mar. 1999, pp. 101-107.

* cited by examiner

SYSTEM AND METHOD FOR INDUCTION MOTOR SPEED ESTIMATION USING A SOFT STARTER SYSTEM

BACKGROUND OF THE INVENTION

Embodiments of the invention relate generally to alternating current (AC) motors and, more particularly, to a system and method for estimating the speed of an AC motor without an encoder.

Motor soft starters are devices that control application of voltage or current from an AC power source to an induction motor. Soft starters are configured to limit the transient current inrush to the induction motor during start-up, resulting in a "soft" motor starting without affecting the power quality of grid. In operation, power from the AC source is passed through switching devices in the soft starter, such as a pair of anti-parallel or back-to-back solid-state switches in the form of thyristors or silicon controlled rectifiers (SCRs), to control the current flow and, in turn, the terminal voltages of the induction motor.

In general, the soft starter temporarily reduces current in the motor during startup via selective control of the thyristors without this control the motor currents can reach 6 to 8 time rated current. This reduction allows for reduced stresses on the motor and electrical network, which increases the life of the system. The thyristors are "triggered" or "fired" (controlled to turn-on) at a given angle, γ, as measured when the voltage becomes positive. The resulting currents flow through the given phases until they reach zero, at which point the thyristors turn off. This pattern creates a "notch" in the voltage. The larger the notch width, the smaller the rms voltage applied to the motor. Since torque is a function of the square of the rms voltage, the larger the notch width, the smaller the torque. If the notch width is zero, full voltage is applied to the motor. Typically, the soft starting process lasts a few seconds, at the end of which the system reaches its final speed and contactors are closed to bypass the SCRs.

Knowledge of the rotational speed of the AC motor is useful for optimizing motor starting controls and operation of AC motors both during the motor start up process and thereafter. Existing motor speed estimation methods for AC motors often depend on high-frequency current injection, which is not feasible with an AC motor driven by a thyristor-based soft starter. Other known methods rely on complicated observers, motor equivalent models, or both, which are largely impractical on thyristor-based soft starter systems, especially soft starters that operate only for a short period of time. For example, one known technique that estimates motor speed relies on a Fast Fourier Transform (FFT) analysis of the current waveforms and slight deviations in the current waveforms due to machine rotor winding asymmetries is computationally intensive and lacks in generality because motor asymmetries vary from one machine to another. Another known method of estimating speed uses a model-reference adaptive system that is torque-based for a first portion of the range from start to nominal speed and flux-based for the remaining portion of the speed range. This model-based technique is computationally intensive and depends on knowledge of numerous machine parameters, resistances, and inductances. Yet another known technique skips a triggering event in one phase to induce transients in the current and phase lag. However, the small magnitude of the resulting signal is difficult to monitor.

While some of the aforementioned techniques skip SCR triggering or firing events in order to estimate motor speed, these techniques do not make any provision for the dangerous current transients that may be induced when resuming SCR firing after some interruption on a machine that is rotating. After disconnection, the speed of the motor costs down and the back-emf generated is no longer at the same frequency or phase as the mains voltage. If the mains voltage and the back-emf are out of phase when a live reclosing is attempted, a voltage of up to two times the mains voltage will be applied to the AC machine, resulting in high and potentially destructive transient currents.

Accordingly, it would be desirable to have a sensorless system capable of estimating the rotational speed of a thyristor-driven AC motor that does not rely on knowledge of operating machine parameters for a particular AC motor or operate using a computationally intensive technique. It would also be desirable for such a soft starter system to acquire rotational speed estimates without inducing potentially destructive transients in the system.

BRIEF DESCRIPTION OF THE INVENTION

The present invention provides a system and method estimating operating characteristics of an induction motor controlled by a motor soft starter.

According to one aspect of the invention, a motor control device is electrically connectable between an AC motor and an AC power source, the motor control device includes a plurality of switching devices comprising at least one thyristor corresponding to a respective phase of the AC motor. The motor control device also includes a controller programmed to disconnect the AC power source from the AC motor for a predetermined time period following a first plurality of cycles of a mains phase voltage of the AC power source. The controller is further programmed to measure a back-emf voltage during the predetermined time period, estimate an operating characteristic of the AC motor from the measured back-emf voltage, and trigger the plurality of switching devices to reconnect the AC power source to the AC motor.

According to another aspect of the invention, a method of estimating speed of an AC motor having a soft starter includes controlling the soft starter to disconnect the AC motor from an AC source for a disconnection period and measuring a back-emf voltage of the AC motor during the disconnection period. The method also includes estimating a speed of the AC motor from the measured back-emf voltage, and controlling the soft starter to reconnect the AC motor to the AC source by triggering a thyristor of the soft starter according to a multi-step firing sequence. One firing of the thyristor is timed to follow a zero crossing of a mains phase voltage of the AC source and a subsequent firing of the thyristor is timed to follow a zero crossing of the voltage of the thyristor.

According to yet another aspect of the invention, a motor soft starter includes a circuit having an input connectable to an AC source and an output connectable to an input terminal of an AC motor, the circuit including at least one thyristor. The motor soft starter also includes a controller connected to the circuit. The controller is programmed to operate the motor soft starter to connect the AC motor to the AC source, operate the motor soft starter to disconnect the AC motor from the AC source for a disconnection period, and measure a back-emf voltage of the AC motor during the disconnection period. The controller is further programmed to estimate a rotational speed of the AC motor from the measured back-emf voltage and operate the motor soft starter to reconnect the AC motor to the AC source after the disconnection period.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The embodiments of the invention set forth herein relate to a system and automated method for estimating rotational speed of an alternating current (AC) motor during motor start-up, when the motor is operating at full speed, and during motor shutdown as the motor is being ramped down to a stop. While embodiments of the invention are described herein as being used in connection with a multi-phase AC power source and multi-phase AC motors, one skilled in the art will recognize that embodiments of the invention are applicable to single-phase AC power sources and single phase induction motors.

Figure 1:
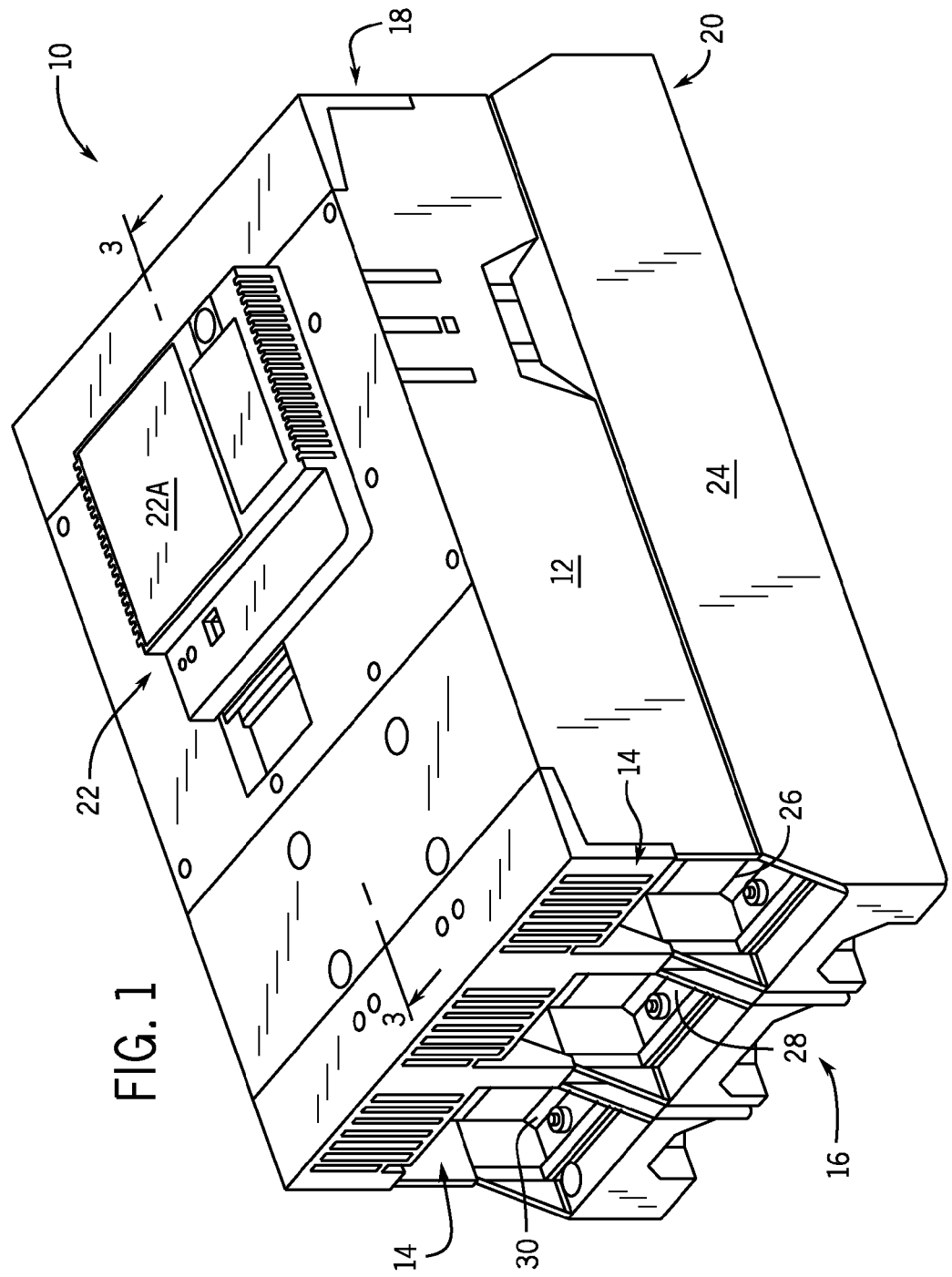
FIG. 1 is a perspective view of a soft starter for use with embodiments of the present invention.

Referring to FIG. 1, a motor control device 10 is shown that can be used in implementing embodiments of the invention set forth below. In an exemplary embodiment of the invention, motor control device 10 comprises a soft starter configured to limit the transient voltages and currents to a multi-phase AC motor during motor start-up, and will be referred to such herein. Soft starter 10 includes a cover assembly 12 having air inlets 14 on a motor connection end, or load end 16. Similar air outlets 18 are located on a power source end, or line end 20 of the soft starter 10. The cover assembly 12 also houses an electronic controller 22. Soft starter 10 also includes a base assembly 24 to house each of switch assemblies 26, 28, 30. Each of the switch assemblies 26-30 is identical in construction for a given soft starter 10 and corresponds to a given phase of a multi-phase input to the multi-phase AC motor.

It is recognized that soft starter 10 illustrated in FIG. 1 is merely an example of a soft starter architecture/structure that may be used in implementing embodiments of the invention, and that other various soft starter architectures/structures used or required to meet specific application requirements are also understood to be included within the scope of the invention. For example, a range of open chassis soft starter configurations could be used in implementing embodiments of the invention rather than the housed soft starter shown in FIG. 1.

Figure 2:
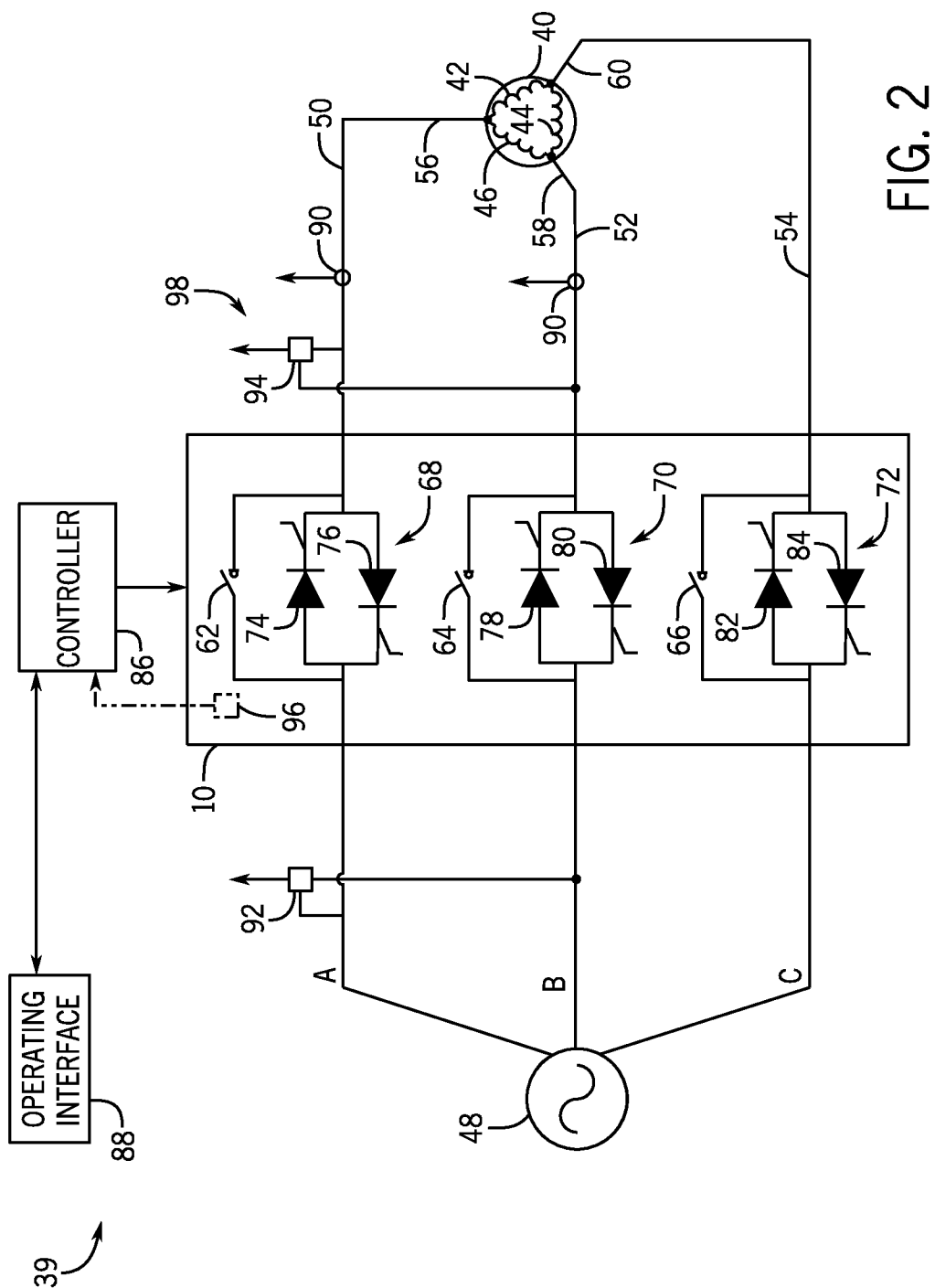
FIG. 2 is a schematic view of an AC motor system incorporating a soft starter according to an embodiment of the invention.

Referring to FIG. 2, an AC motor system 39 incorporating a three-phase, induction motor or AC motor 40 is schematically shown according to an embodiment of the invention. As is conventional, AC motor 40 is represented as three stator windings 42, 44, 46. In this case, AC motor 40 is shown connected in a delta-arrangement. It can be appreciated that AC motor 40 may alternatively, and according to the equivalents of the invention, be connected in a wye arrangement without deviating from the scope of the invention. Stator windings 42-46 of AC motor 40 are operatively connected to an AC power source 48 through corresponding multi-phase supply lines 50, 52, 54, at motor terminals 56, 58, 60.

In the embodiment shown in FIG. 2, soft starter 10 includes a circuit having an input connected to AC power source 48 and an output connected to an AC motor 40 and is located outside the AC motor 40 (i.e., outside the delta). Alternatively, soft starter 10 may be positioned inside the AC motor 40 (i.e., inside the delta). As one skilled in the art will recognize, the embodiments described herein may be adapted for such a configuration.

Soft starter 10 is configured to limit the transient voltages and current to AC motor 40 during start-up, resulting in a "soft" motor starting. The basic structure of soft starter 10 (i.e., circuitry of the soft starter) is shown in FIG. 2 as including a bypass contactor 62, 64, 66 corresponding to each supply line 50, 52, 54 or each phase of the supply power. Soft starter 10 also includes a switching device 68, 70, 72 on each supply line 50, 52, 54. In an exemplary embodiment each switching device 68, 70, 72 is formed of a pair of anti-parallel switches, such as solid-state switches or thyristors in the form of silicon controlled rectifiers (SCRs), to control the current flow and, in turn, the terminal voltages of the motor 40. While the switching devices 68, 70, 72 are described herein as being SCRs, alternative embodiments may include other thyristor-type devices such as, for example, gate turn-off thyristors (GTOs).

As shown, switch pair 68 includes two SCRs 74, 76 which are opposite in polarity and are connected in parallel for supply line 50. Likewise, switch pair 70 includes two SCRs 78, 80, which are opposite in polarity and are connected in parallel for supply line 52. Finally, switch pair 72 includes two SCRs 82, 84, which are opposite in polarity and are connected in parallel for supply line 54. In one embodiment, SCRs 74, 78, 82 are forward conducting and SCRs 76, 80, 84 are backward conducting.

While each phase is shown as including a pair of SCRs 74-84, it is also envisioned that soft starter 10 could have a pair of SCRs on only two supply lines (e.g., only supply lines 50, 52). In any of the embodiments described above a SCR 74-84 on a single supply line can be controlled to control the input voltage and current received by AC motor 40, as described below.

Also included in soft starter 10 is a controller or processor 86 programmed to control operation of individual SCRs 74-84 via the transmission of gate drive signals thereto, as well as to control opening and closing of bypass contactors 62-66. During start-up/ramp-up of AC motor 40 (and similarly during a ramp-down), soft starter 10 operates in a "start-up" or "ramping" mode, during which controller 86 causes contactors 62-66 corresponding to supply lines 50-54 to be kept open such that the power from AC source 48 passes through switch pairs 68-72, thus controlling the current flow (and therefore the voltage) applied to the AC motor 40.

During this "start-up" or "ramping" mode, controller 86 transmits gating signals to the switch pairs 68-72 to independently trigger operation of the switch pairs 68-72 in each phase according to a predefined timing sequence during each half-cycle of the mains voltage. The predefined timing sequence controls the duration during which the SCRs 74-84 remain conductive. Once an SCR 74-84 is triggered or fired, it remains in a conductive state until a zero crossing of the current flowing through the SCR 74-84. When the SCR 74-84 is non-conductive, a notch having a width γ is introduced into the supply voltage each time the associated line current falls to zero. The duration of the notch width γ is controlled by varying the timing of the gating signals during the "start-up" or "ramping" mode. As the duration of the notch width γ decreases, the SCRs 74-84 are conductive for longer periods of time and provide a gradual increase in the terminal voltages of the AC motor 40 until the AC motor 40 accelerates to full speed. During the duration of the notch γ, the given switch pair 68-72 connecting the respective stator winding 42-46 to the AC source 48 operates as an open circuit, so that, instead of observing a sinusoidal supply voltage at the respective motor terminal 56-60, an internally generated motor back-emf voltage may be observed.

Once the AC motor 40 reaches full speed, the soft starter 10 enters a "bypass" mode in which controller 86 causes the respective bypass contactor 62-66 on each supply line 50-54 to close, so as to bypass the switch pairs 68, 70, 72 and minimize power dissipation. The bypass mode thus is considered the "normal" mode of operation for the soft starter 10 and AC motor 40 when the AC motor 40 is operating at full speed.

Controller 86 is operationally coupled to an operating interface 88, which may be embodied in a computer workstation or operating panel as examples. Operating interface 88 may be configured to display operating information output by controller 86 and/or to permit an operator to selectively control operation of controller 86 according to various embodiments.

During operation of soft starter 10, ongoing processing occurs within the soft starter 10 in which measurements and/or calculations of the current being drawn by AC motor 40 are performed. Data for these measurements and/or calculations is acquired from a set of current sensors 90. In one embodiment, current measurements and/or calculations are performed at approximately every half cycle of the input line frequency. However, these measurements and/or calculations may be performed more or less frequently in alternative embodiments. In the illustrated embodiment, the set of current sensors 90 includes current sensors in two of the three phases. Alternative embodiments may include a respective current sensor for each of the three phases or a single sensor used in just one of the phases.

The soft starter system is also equipped with one or more line-side voltage sensors 92 and one or more load-side voltage sensors 94. While only one line-side voltage sensor and one load-side voltage sensor are illustrated in FIG. 2, alternative embodiments may include one or more additional voltage sensors. An optional temperature sensing unit 96 (shown in phantom) comprising one or more temperature sensors, also may be provided to monitor the temperature of soft starter 10. Together, the current sensors, voltage sensor(s), and temperature sensing unit (if used) form a sensor system 98 that provides feedback to controller 86.

Figure 3:
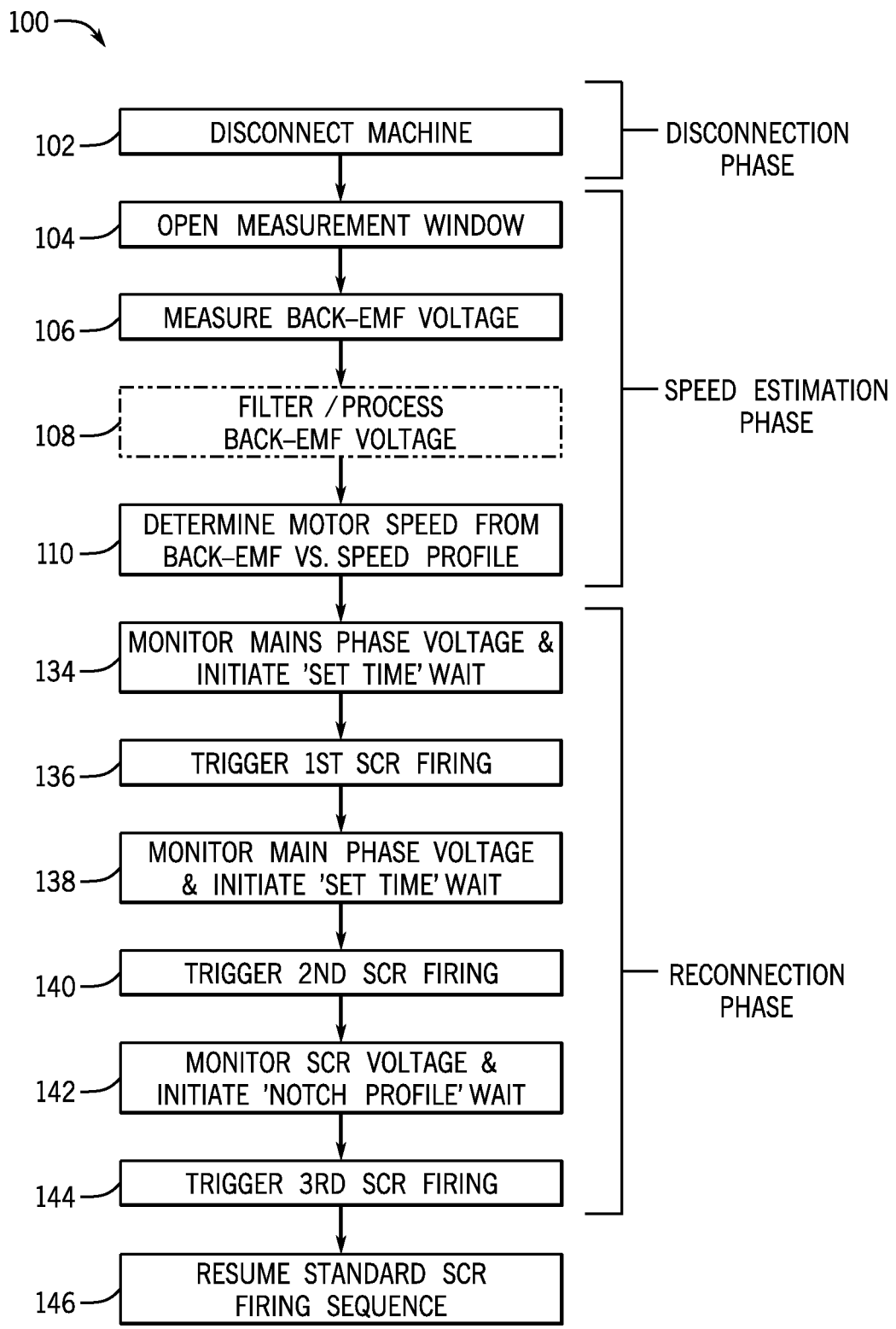
FIG. 3 is a flowchart illustrating a technique for estimating speed of an AC motor driven by a soft starter according to an embodiment of the invention.

An automated technique 100 for estimating an operating characteristic of an electric motor driven by a soft starter 10 of FIGS. 1 and 2, is illustrated in FIG. 3, according to an embodiment of the invention. While the operating characteristic estimated by technique 100 is described in the embodiment below as the rotational speed of the AC motor, it is contemplated that technique 100 may be extended to estimate other operating characteristics, including a torque loading of the AC motor, a power generated by the AC motor, and a system inertia. Also, the operating characteristics output by technique 100 may be used to identify whether the AC motor is in a motoring mode or in a generating mode. Technique 100 may further be extended to monitor operating characteristics related to motor wellness and operating characteristics used to identify malfunctions.

In general, technique 100 interrupts the predefined timing sequence in which the SCRs are fired during the start-up mode to disconnect the motor from the source for one or more line power cycles by turning the SCRs off, measures the motor back-emf during these time intervals when the motor line currents are zero, and resumes normal operation following measurement of the back-emf. The reconnection of the motor to the source is accomplished by firing the SCRs in a manner that provides a smooth restart of the electric motor and avoids high and potentially destructive transient currents that may be induced during the restart.

Technique 100 detects the rotational speed of an AC motor in a number of steps that can generally be divided into three main stages: an initial stage during which the AC motor is disconnected from the mains voltage, an intermediate stage wherein the machine back-emf is measured, and a final stage during which the firing of the SCRs is resumed to reconnect the AC motor to the AC power source. While the various steps of technique 100 are described herein as falling within three general stages, the division of the steps of technique 100 into a certain number of defined stages is done herein to facilitate explanation of technique disclosed herein. One skilled in the art will recognize that the steps of technique 100 may be divided into more or less than three stages in alternative embodiments without deviating from the general scope of the invention.

The initial stage of technique 100 begins at step 102 when the AC motor is disconnected from the mains voltage by turning off all gating signals to the SCRs for a predetermined time period. The number of cycles during which the SCRs are not fired may be as small as one half of a cycle (i.e., a single firing) or as large as multiple cycles, according to alternative embodiments. During this disconnection period the motor current is zero. As used herein a "cycle" is defined as the time span of one period of the mains voltage. In a 50 Hz system, for example, a cycle lasts 20 ms. During operation, a soft starter system is fired two times per cycle for each phase, once during the positive portion of the cycle, and once during the negative portion of the cycle. In one embodiment, a relatively small number of cycle interruptions is implemented, such as, for example, less than five (5) cycles, so as to not interfere with the system acceleration or operation and to facilitate re-energizing the AC motor. In an alternative embodiment, a larger number of cycle interruptions may be used, such as, for example, more than five (5) cycles, to permit measurement of the speed decay over time.

After the motor is disconnected from the mains voltage, technique 100 enters the intermediate stage of the speed estimation technique and opens a measurement window for the back-emf at step 104. This measurement window may be opened either at the beginning of the cycle where the SCR firing is disconnected, or at a given time thereafter, such as one half cycle or one full cycle after disconnect, according to various embodiments. Thus, the duration of the measurement window may be equal to the total number of cycle interruptions during which the motor is disconnected from the mains voltage or a sub-portion thereof in alternative embodiments.

During the measurement window and when the input current to AC motor 40 is zero, technique 100 measures the back-emf voltage of one or more of the phases at step 106 and stores the measured back-emf voltage in a non-volatile memory, which may be embodied within controller 86 or provided external to controller 86 in alternative embodiments. In one embodiment, the back-emf voltage is determined by measuring the peak value of the line-to-line voltage using sensor system 98. The peak value may be acquired by monitoring the voltage of a single phase or multiple phases. Where voltage data from multiple phases is acquired, the maximum back-emf voltage may be determined at step 106 as an average of the peak voltage values from two or more phases. Further, where the measurement window occurs during a period in which AC motor 40 is operating at low speed, the maximum or peak of the back-emf voltage may not occur during the disconnection window. If technique 100 determines that an actual peak of the back-emf voltage did not occur during the measurement window, technique 100 may acquire voltage data over a number of sequential disconnection periods and use an average of the voltage magnitudes acquired during those sequential disconnection periods as the maximum back-emf voltage for speed estimation.

Optionally, the maximum back-emf voltage value is filtered or processed at 108 (shown in phantom). During this step 108 the maximum back-emf voltage may be filtered to reduce noise or otherwise processed based on the given application. Additionally, the voltage is sampled at a high rate and a digital or analog filter may be used to measure the voltage. Further a peak voltage measurement algorithm may be used to measure the peak voltage.

At step 110, an estimate of the rotational speed of AC motor 40 is determined based on an analysis of the maximum back-emf voltage value and a speed profile for AC motor 40. Using the measured maximum back-emf voltage value, a motor speed estimate is determined from a back-emf versus speed profile, such as profile 112 illustrated in FIG. 4. While the estimated speed determined at step 110 may not reflect the exact real-time speed of AC motor 40, the estimated speed may be output to operating interface 88 as an indicator of the response of the AC motor 40 to the present start-up sequence, thereby permitting an operator or automated control to monitor that AC motor 40 is not over-powered or under-powered during motor start up and subsequent operation. The actions described above with respect to steps 106-110 are referred to hereafter as the "peak voltage approach" for estimating motor speed.

In one embodiment of the invention, the speed estimate may be further refined to account for the decrease in motor speed that occurs as soon as the motor is disconnected from the AC power source 48. Because of the speed decrease following disconnection is instantaneous and the back-emf voltage measurement does not occur simultaneously with disconnection, the estimated rotational speed of AC motor 40 is less than the actual speed at the time of disconnection. Inasmuch as the rotational speed at the time of disconnection is the quantity of interest, the back-emf voltage may be measured for two or more cycles during a given measurement window, with the time at which the peak back-emf voltage values occurred during these cycles recorded. A line or an exponential may be drawn from these peaks and used to extrapolate back and estimate the back-emf voltage at the time of disconnection. Alternatively, or in addition to this refinement process, an average value of the peak back-emf voltage from multiple phases may be used to attain the speed estimate. In one other embodiment of the invention, the back-emf voltage measurement over two or more cycles during a given measurement window is used to determine the decay of the back-emf voltage over time, so as to provide an estimate of the system load torque, the system inertia, or both.

Figure 4:
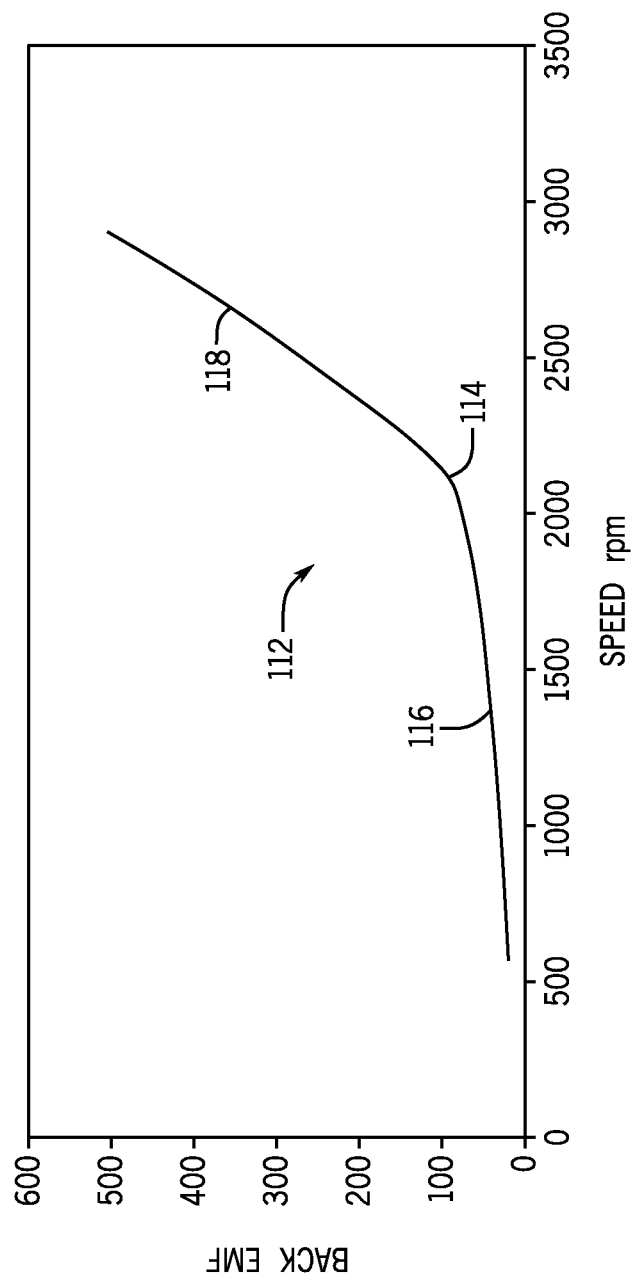
FIG. 4 illustrates an exemplary back-emf voltage versus speed profile usable with the technique of FIG. 3.

As illustrated in FIG. 4, the back-emf voltage versus speed profile 112 represents the relationship between back-emf voltage and rotational speed for an exemplary type or class of induction motor. This exemplary motor has a synchronous speed of 3,000 rpm, and is excited with a supply voltage of 550V, such that FIG. 4 illustrates a back-emf profile for motor speed from standstill to full speed. The slope of the back-emf voltage versus speed profile 112 changes at a knee 114, such that profile 112 includes two substantially linear segments 116, 118, with the first segment corresponding to approximately the first two-thirds of the increase in speed from start up to synchronous speed and the second segment 118 corresponding to approximately the final third of the speed increase. At speeds below the knee 114, the slope of the back-emf voltage versus speed profile 112 is relatively flat because the induction machine equivalent circuit is dominated by its magnetizing inductance at lower speed. At speeds above the knee 114, the back-emf voltage dominates the voltage versus current relationship, thereby resulting in a steeper slope of the back-emf voltage versus speed profile 112 in this portion of the profile.

While the back-emf voltage versus speed profile 112 illustrated in FIG. 4 is applicable to an exemplary induction motor, the general pattern of this relationship between back-emf voltage and rotational speed may be assumed to be applicable to any induction motor that uses reduced voltage starting. However, the location of the knee and the slopes of the line segments 116, 118 before and after the knee 114 may vary from one machine design to another. In one embodiment the back-emf voltage versus speed profile used by technique 100 may be a general back-emf voltage versus speed profile for a general type of motor design. Alternatively, the back-emf voltage versus speed profile may be attained from the actual system under use from motor nameplate information, such as, for example, slip or rated speed, since motor-to-motor variation is negligible.

In an alternative embodiment, the motor speed estimate is attained using a "rotating voltage vector approach". In this embodiment, sensor system 98 is used to measure the phase voltage of the AC motor 40 when the soft starter 10 is disconnected from the AC source. The measured 3-phase voltages are transformed into a 2-phase d-q stationary frame, thereby generating a rotating voltage vector. The magnitude and frequency of the rotating voltage vector is attained by using a Phase-Locked-Loop (PLL). The frequency of the back-emf voltage vector attained using the PLL can be used to attain a more accurate estimate of motor speed than the peak voltage approach described above.

The accuracy with which the back-emf voltage may be measured using the rotating voltage vector approach varies based on motor speed, with more accurate measurements being obtained when the motor is rotating at speeds above, for example, half of the rated speed. Accordingly, in an alternative embodiment technique 100 is configured to estimate motor speed using a hybrid voltage measurement approach, where speed estimates are attained using the peak voltage approach described above with respect to steps 106-110 at low speeds and using the rotating voltage vector approach at high speeds. In this embodiment, technique 100 estimates motor speed from the frequency of the back-emf voltage vector acquired using the PLL when the motor is operating at high speeds (e.g., above approximately 50% rated speed). When the motor is operating at low speeds (e.g., below approximately 50% rated speed), on the other hand, technique 100 estimates motor speed using a back-emf voltage versus speed profile, where the magnitude of the back-emf voltage is determined from a peak value measured during one disconnection period or the average values measured over several sequential disconnection periods.

Figure 5:
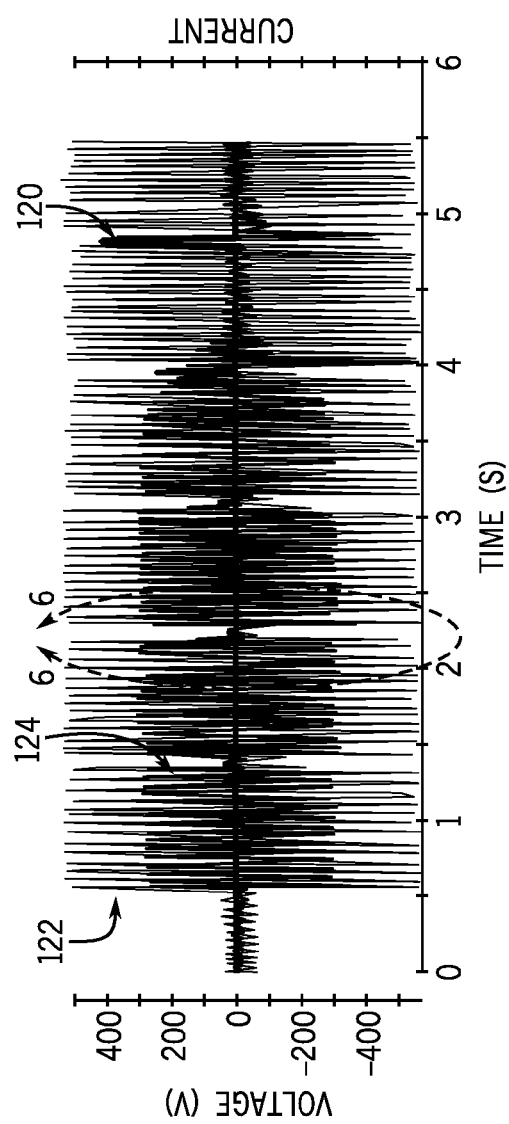
FIG. 5 illustrates exemplary current, back-emf, and line voltage traces for an AC motor operated in accordance with the technique of FIG. 3 during start-up and normal operation modes.
Figure 6:
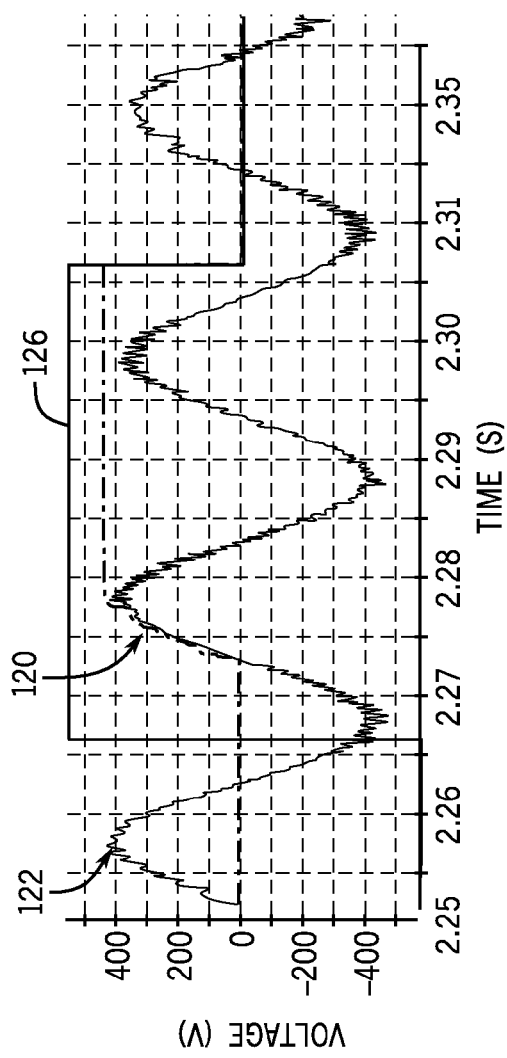
FIG. 6 is a detailed view of the exemplary line voltage and back-emf traces from the plot of FIG. 5 over a given measurement window.

FIG. 5 illustrates the back-emf voltage 120, line voltage 122, and current 124 for one phase of an exemplary AC motor, such as AC motor 40, over a period of time during which technique 100 initiates speed-measuring interruptions at set time intervals during motor start-up. Where the AC motor 40 is a three-phase motor, the other two phases would be simply shifted by 120 degrees. In the illustrated example, the timing of the SCR firing from the start-up sequence is interrupted every one (1) second after the beginning of the start. FIG. 6 is a detailed view of the of the back-emf voltage 120 during one of the speed-measuring interruptions. As shown in FIG. 6, the AC motor is disconnected from the AC power source 48 at time=2.25 s (step 102) and remains disconnected for three (3) full cycles. The measurement window 126 is opened at time=2.267 s (step 104), after which the technique 100 searches for the maximum of the back-emf (step 106).

Referring again to FIG. 3, after measurement of the back-emf voltage and speed estimation is complete, technique 100 enters the final stage of the speed estimation technique during which the AC motor is reconnected to the voltage mains. As previously described, particular care must be taken when reconnecting so as to avoid reconnecting when the back-emf is out of phase with the mains voltage. Accordingly, technique 100 resumes the SCR firing with a timing sequence that deviates from the timing sequence used during standard operation (i.e., the timing sequence in place prior to disconnection).

Figure 7:
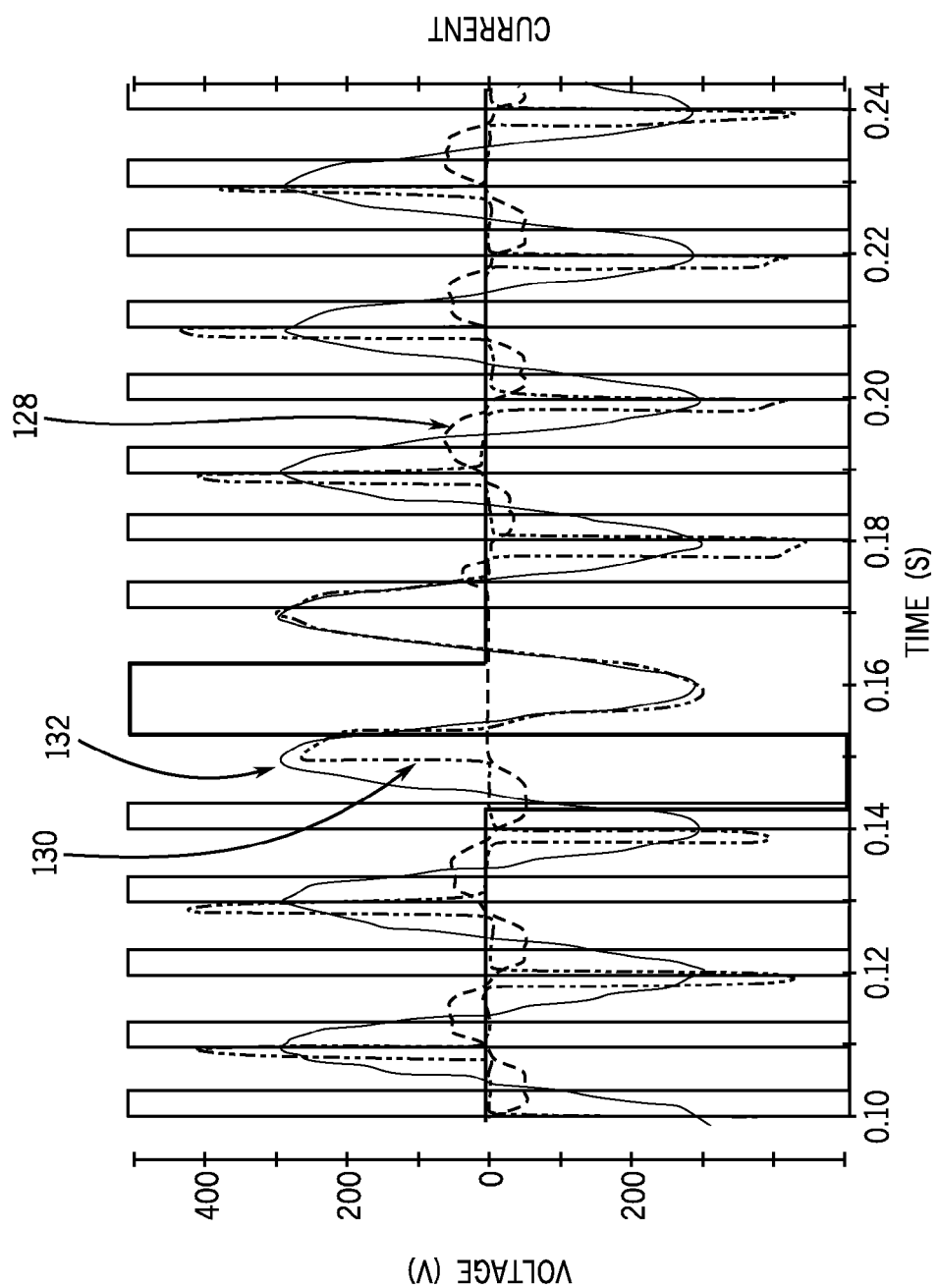
FIG. 7 illustrates exemplary current, SCR voltage, and line voltage traces during a reconnection phase of the technique of FIG. 3, wherein the switching devices are fired to reconnect the AC motor to the source.

The exemplary current 128, SCR voltage 130, and line voltage 132 traces prior to, during, and following disconnection are illustrated in FIG. 7. As described below with respect to FIG. 3 and FIG. 7, technique 100 triggers two SCR firings following a zero crossing of the mains phase voltage and triggers a third SCR firing following a zero crossing of the voltage across the SCR using different wait times for the first two and third firings. For a three-phase motor embodiment, the steps of the final stage of technique 100 are described below for one of the three phases. The other two phases will follow the same pattern prior to resuming normal operation.

The third phase of technique 100 is entered at time=0.16 s in FIG. 7, after the back-emf measurement is complete. At this point, technique 100 begins monitoring the mains phase voltage 132 at step 134 to identify a zero crossing. As illustrated in FIG. 7, no current is flowing through the SCRs during this period and the SCR voltage 130 is the same as the mains phase voltage 132. In the example illustrated in FIG. 7, this first zero crossing occurs at approximately time=0.166 s. Following the zero crossing, a 'set time' wait is initiated. After the 'set time' wait has elapsed, technique 100 triggers the first SCR firing at step 136, at time=0.17 s in FIG. 7.

In one embodiment, the duration of the 'set time' wait is determined by measuring the angle between the zero crossing of the mains phase line-to-line voltage 132 and the beginning of a conduction period or zero crossing of the corresponding phase current 128 prior to disconnection. Alternatively, the 'set time' wait may be set equal to the phase lag between voltage and current, as measured off-line using a machine model or observer algorithm.

According to yet another embodiment, the 'set time' wait is defined between 90 degrees and 45 degrees according to a preset schedule as a function of back emf voltage. In an exemplary embodiment, the set time wait is 90 degrees if the back-emf voltage is less than seventy percent of the mains phase voltage, 80 degrees if the back-emf voltage is between seventy and eighty percent of the mains phase voltage, 75 degrees if the back-emf voltage is between eight and ninety percent of the mains phase voltage, 70 degrees if the if the back-emf voltage is between ninety and ninety-five percent of the mains phase voltage, and 45 degrees if the back-emf voltage is greater than ninety-five percent of the mains phase voltage (indicating the motor is operating at nominal speed).

After triggering the first SCR firing, technique 100 returns to monitoring the mains phase voltage 132 at step 138 for a zero crossing, which occurs at approximately time=0.176 s. Following the detected zero crossing, the 'set time' wait is again initiated. After the 'set time' wait has elapsed, technique 100 triggers the second SCR firing at step 140, corresponding to time=0.18 s in FIG. 7.

Following the second SCR firing, technique 100 begins monitoring the voltage across the SCRs 130 at step 142 to detect a zero crossing. At time=0.187 s the zero crossing is attained, as illustrated in FIG. 7. When the zero crossing of the SCR voltage 130 is detected, technique 100 initiates a 'notch profile' wait. The duration of this 'notch profile' wait is determined from the designed notch profile formula used by the soft starter prior to disconnection. Thus, the notch width γ of this third SCR firing is the same as the notch width γ immediately prior to disconnection. Following the 'notch profile' wait, technique 100 triggers the third SCR firing at step 144, corresponding to time=0.19 s in FIG. 7. At step 146 the SCR firing resumes operating in accordance with the timing sequence in place prior to disconnection.

In an alternative embodiment, technique 100 may be modified to reconnect the AC motor to the AC power source using a two-step firing sequence. In such an embodiment, the first SCR firing is completed in the same manner as described with respect to steps 134 and 136 following a zero crossing of the mains phase voltage and associated 'set time' wait. The second SCR firing is then completed in the same manner as described with respect to steps 142 and 144 following a zero crossing of the SCR voltage.

While technique 100 is described above as operating during motor start up, technique 100 may be extended to provide an estimate of motor speed during normal operation, that is when the motor is operating at full speed, at a time when the bypass contactors of the soft starter are typically in a closed position. During normal operation, technique 100 is modified to trigger the SCRs prior to opening the bypass contactors. Once the bypass contactors are open, the motor is disconnected for a short time period, such as one or two cycles, and the SCR notch voltage is observed to confirm that the SCRs are off and no current is being conducted therethrough. Motor speed is then estimated during the disconnection period using either the peak voltage approach or the rotating voltage vector approach described above. After the measured voltage is used to estimate motor speed, the bypass contactors are closed simultaneously when the SCRs are fired, with the first two SCRs being fired at a zero crossing of the line voltage and the timing of the third SCR firing selected to minimize current transients in the SCR.

Where the soft starter is coupled to a type of motor of which the voltage may be ramped down when coasting down a stop, such as in a pump application for instance where abrupt pressure drops in the fluid are to be avoided, technique 100 may also be extended to estimate motor speed while the motor is being controlled to come to a stop. In such an embodiment, the peak voltage approach may be applied to determine an estimate of the motor speed based on a back-emf voltage versus speed profile for the motor, as described above. Alternatively, the rotating voltage vector approach may be used to estimate motor speed for a period of time immediately following disconnection when the motor remains rotating at relatively high speeds. Once the motor has slowed to lower speeds (e.g., below approximately 50% rated speed), the speed estimate technique may transition to using the peak voltage approach since the cycle time is too large during this period to attain accurate speed estimates using the rotating voltage vector approach.

In one embodiment, technique 100 may be implemented into an auto-tuning algorithm of a soft starter as a test subroutine wherein the estimated speed of the machine is used to ascertain the quality of the motor start sequence, or the quality of the motor coasting down sequence. If the estimated speed does not correspond to the desired speed, the estimated speed may be used by the auto-tuning algorithm to modify the timing of subsequent SCR firings within the present start up sequence and/or subsequent starts. Based on the amount of deviation between the estimated speed and the desired speed, the auto-tuning algorithm may also be programmed to abort the current start up sequence.

In another embodiment, technique 100 may also be utilized to provide diagnostics by monitoring the speed of the machine to diagnose the health of the machine or of its load, during start up, normal operation, or both. In such an embodiment, the estimated motor speed may be output to an operator interface, such as interface 88.

Technique 100 may also be used for load identification purposes, as the speed of the machine during start up, normal operation, or while it is coasting after disconnection, to provide key information for the measurement of the load torque and inertia. In such an embodiment, technique 100 would be modified to include a step of calculating the machine torque prior to disconnection at step 102 and thereafter observing the back-emf for a number of steps following the disconnection. If the disconnection occurred when the machine was at nominal speed, the machine torque calculation, based on observing the machine slip for instance, corresponds to the load torque. By assuming that the load torque is constant during the disconnection, the decay in speed during the disconnection may be used to determine the system inertia using known kinematic equations.

In yet another embodiment, technique 100 may be used in a generating system, or a system with dual use motoring/generating. In this case, technique 100 can ascertain whether the electric machine is running over, or under, synchronous speed, with a speed below synchronous speed corresponding to motoring, and a speed over synchronous corresponding to generating. Further, if generating, in a wind application for instance, and since the frequency of the back-emf voltage determines the power exported into the grid, technique 100 and the resulting speed estimation can be used for active power limiting.

Further, technique 100 can be integrated within, or integrate within its steps, a number of other algorithms and functions, such as diagnostic functions, protection functions, current limiting functions, energy monitoring functions, and the like, that technique 100 can work cooperatively with, or enhance by such methods and steps as information exchange and the like. As such technique 100 may be embedded within, or encompass, a larger or much larger soft starter control system.

A technical contribution for the disclosed method and apparatus is that it provides for a controller-implemented technique for estimating operating characteristics of an AC motor, such as the rotational speed of the AC motor.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Therefore, according to one embodiment of the invention, a motor control device is electrically connectable between an AC motor and an AC power source, the motor control device includes a plurality of switching devices comprising at least one thyristor corresponding to a respective phase of the AC motor. The motor control device also includes a controller programmed to disconnect the AC power source from the AC motor for a predetermined time period following a first plurality of cycles of a mains phase voltage of the AC power source. The controller is further programmed to measure a back-emf voltage during the predetermined time period, estimate an operating characteristic of the AC motor from the measured back-emf voltage, and trigger the plurality of switching devices to reconnect the AC power source to the AC motor.

According to another embodiment of the invention, a method of estimating speed of an AC motor having a soft starter includes controlling the soft starter to disconnect the AC motor from an AC source for a disconnection period and measuring a back-emf voltage of the AC motor during the disconnection period. The method also includes estimating a speed of the AC motor from the measured back-emf voltage, and controlling the soft starter to reconnect the AC motor to the AC source by triggering a thyristor of the soft starter according to a multi-step firing sequence. One firing of the thyristor is timed to follow a zero crossing of a mains phase voltage of the AC source and a subsequent firing of the thyristor is timed to follow a zero crossing of the voltage of the thyristor.

According to yet another embodiment of the invention, a motor soft starter includes a circuit having an input connectable to an AC source and an output connectable to an input terminal of an AC motor, the circuit including at least one thyristor. The motor soft starter also includes a controller connected to the circuit. The controller is programmed to operate the motor soft starter to connect the AC motor to the AC source, operate the motor soft starter to disconnect the AC motor from the AC source for a disconnection period, and measure a back-emf voltage of the AC motor during the disconnection period. The controller is further programmed to estimate a rotational speed of the AC motor from the measured back-emf voltage and operate the motor soft starter to reconnect the AC motor to the AC source after the disconnection period.

Embodiments of the present invention have been described in terms of the preferred embodiment, and it is recognized that equivalents, alternatives, and modifications, aside from those expressly stated, are possible and within the scope of the appending claims.

What is claimed is:

1. A motor control device electrically connectable between an AC motor and an AC power source, the motor control device comprising:
    a plurality of switching devices comprising at least one thyristor corresponding to a respective phase of the AC motor; and
    a controller programmed to:
        disconnect the AC power source from the AC motor for a predetermined time period following a first plurality of cycles of a mains phase voltage of the AC power source;
        measure a back-emf voltage during the predetermined time period;
        estimate an operating characteristic of the AC motor from the measured back-emf voltage; and
        trigger the plurality of switching devices to reconnect the AC power source to the AC motor.

2. The motor control device of claim 1 wherein the controller is further programmed to:
    trigger the plurality of switching devices according to a sequence that injects current from the AC power source into the AC motor; and
    cease triggering the plurality of switching devices to disconnect the AC power source from the AC motor.

3. The motor control device of claim 2 wherein the controller is further programmed to:
    estimate a rotational speed of the AC motor from the measured back-emf voltage;
    compare the estimated rotational speed to a desired rotational speed; and
    modify the sequence that injects current from the AC power source into the AC motor based on the comparison.

4. The motor control device of claim 1 wherein the operating characteristic comprises a rotational speed of the AC motor.

5. The motor control device of claim 1 wherein the operating characteristic comprises at least one of a torque loading the AC motor, a power output of the AC motor, an operating mode of the AC motor, a system inertia, and a system malfunction.

6. The motor control device of claim 1 wherein the plurality of switching devices comprises silicon controlled rectifiers (SCRs).

7. The motor control device of claim 1 wherein the controller is further programmed to:
    measure a maximum back-emf voltage during the predetermined time period; and
    estimate the rotational speed of the AC motor from the measured maximum back-emf voltage.

8. The motor control device of claim 1 wherein the controller is further programmed to:
    generate a rotating voltage vector from the measured back-emf voltage; and
    estimate the rotational speed of the AC motor from the rotating voltage vector.

9. The motor control device of claim 1 wherein the controller is further programmed to estimate the rotational speed of the AC motor from a back-emf versus speed profile.

10. The motor control device of claim 9 wherein the back-emf versus speed profile is experimentally derived from the AC motor.

11. The motor control device of claim 9 wherein the back-emf versus speed profile is determined from nameplate information of the AC motor.

12. The motor control device of claim 1 wherein the controller is further programmed to resume triggering the plurality of switching devices according to the following sequence:
    (1) trigger a switching device of the plurality of switching devices to fire a first time following one zero crossing of a mains phase voltage;
    (2) trigger the switching device to fire a second time following another zero crossing of the mains phase voltage; and
    (3) trigger the switching device to fire a third time following a zero crossing of a voltage across the switching device.

13. The motor control device of claim 12 wherein the controller is further programmed to:
    trigger the switching device to fire the first and second times following a set time delay measured from the respective zero crossing of the mains phase voltage; and
    trigger the switching device to fire the third time following a notch delay measured from the zero crossing of the voltage across the first switching device, wherein the notch delay differs from the set time delay.

14. The motor control device of claim 13 further comprising a sensor assembly configured to monitor a zero crossing of a line current and the zero crossing of the mains phase voltage; and
    wherein the set time delay is an angle between the zero crossing of the mains phase voltage and the zero crossing of the current.

15. A method of estimating speed of an AC motor having a soft starter, the method comprising:
    controlling the soft starter to disconnect the AC motor from an AC source for a disconnection period;
    measuring a back-emf voltage of the AC motor during the disconnection period;
    estimating a speed of the AC motor from the measured back-emf voltage; and
    controlling the soft starter to reconnect the AC motor to the AC source by triggering a thyristor of the soft starter according to a multi-step firing sequence, wherein one firing of the thyristor is timed to follow a zero crossing of a mains phase voltage of the AC source and a subsequent firing of the thyristor is timed to follow a zero crossing of a voltage of the thyristor.

16. The method of claim 15 further comprising triggering the thyristor according to a three-step firing sequence, wherein the first and second firings of the thyristor are timed to follow a respective zero crossing of the mains phase voltage and the third firing of the thyristor is timed to follow the zero crossing of the voltage of the thyristor.

17. The method of claim 15 further comprising:
generating a rotating back-emf voltage vector using a Phase-Locked-Loop (PLL); and
estimating the speed of the AC motor from the rotating back-emf voltage vector.

18. The method of claim 17 further comprising:
estimating the speed of the AC motor from a peak value of the back-emf voltage when the AC motor is operating with in a first range of speeds; and
estimating the speed of the AC motor from the rotating back-emf voltage vector when the AC motor is operating within a second range of speeds;
wherein the second range of speeds is higher than the first range of speeds.

19. The method of claim 15 further comprising estimating the speed of the AC motor from a peak value of the back-emf voltage.

20. A motor soft starter comprising:
a circuit having an input connectable to an AC source and an output connectable to an input terminal of an AC motor, the circuit including at least one thyristor; and
a controller connected to the circuit, the controller programmed to:
operate the motor soft starter to connect the AC motor to the AC source;
operate the motor soft starter to disconnect the AC motor from the AC source for a disconnection period;
measure a back-emf voltage of the AC motor during the disconnection period;
estimate a rotational speed of the AC motor from the measured back-emf voltage; and
control switching of the at least one thyristor to reconnect the AC motor to the AC source after the disconnection period.

21. The motor soft starter of claim 20 wherein the rotational speed of the AC motor is estimated from a back-emf voltage versus speed profile.

22. The motor soft starter of claim 20 wherein the controller is further programmed to output the estimated rotational speed to a user interface.

23. The soft starter of claim 20 where the controller is further programmed to reconnect the AC motor to the AC source by:
triggering one firing of the at least one thyristor at a first set time following a first zero crossing of a mains phase voltage of the AC source; and
triggering another firing of the at least one thyristor at a second set time following a zero crossing of a voltage across the at least one thyristor.

24. The motor soft starter of claim 23 wherein the first set time is determined from a measured angle between the first zero crossing of the mains phase voltage and a zero crossing of the current of the AC source; and
wherein the second set time is determined from a notch profile formula.

25. The motor soft starter of claim 20 wherein the controller is further programmed to:
compare the estimated rotational speed to a synchronous speed of the AC motor; and
detect whether the AC motor is operating in one of a motoring mode and a generating mode based on the comparison.

26. The motor soft starter of claim 25 wherein the controller is further programmed to limit a power output of the AC motor when the AC motor is operating in the generating mode based on the estimated rotational speed.

* * * * *